(12) United States Patent
Teng et al.

(10) Patent No.: US 9,148,191 B2
(45) Date of Patent: Sep. 29, 2015

(54) PORTABLE ELECTRONIC DEVICE HAVING NEAR FIELD COMMUNICATION APPLICATION FUNCTION

(71) Applicant: HON HAI PRECISION INDUSTRY CO., LTD., New Taipei (TW)

(72) Inventors: Ju-Wen Teng, New Taipei (TW); Hsi-Hung Fu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/060,621

(22) Filed: Oct. 23, 2013

(65) Prior Publication Data

US 2014/0179225 A1 Jun. 26, 2014

(30) Foreign Application Priority Data

Dec. 24, 2012 (TW) .............................. 101224975 A

(51) Int. Cl.
*H04B 5/00* (2006.01)
*H04B 1/3827* (2015.01)
*H04M 1/725* (2006.01)
*H04W 4/00* (2009.01)

(52) U.S. Cl.
CPC ........... *H04B 1/385* (2013.01); *H04M 1/72522* (2013.01); *H04B 2001/3861* (2013.01); *H04M 2250/04* (2013.01); *H04W 4/008* (2013.01)

(58) Field of Classification Search
CPC ... G04G 19/00; H04W 4/008; H04M 2250/04
USPC .................. 455/41.1, 41, 2, 41.3, 552.1, 573, 455/343.1; 368/203, 204
See application file for complete search history.

(56) References Cited

U.S. PATENT DOCUMENTS

| 5,889,737 | A | * | 3/1999 | Alameh et al. ................. 368/204 |
| 6,158,884 | A | * | 12/2000 | Lebby et al. ................... 368/282 |
| 6,619,835 | B2 | * | 9/2003 | Kita ............................... 368/281 |
| 6,874,931 | B2 | * | 4/2005 | Noirjean et al. ............... 368/282 |
| 8,725,842 | B1 | * | 5/2014 | Al-Nasser ...................... 709/219 |
| 2014/0045547 | A1 | * | 2/2014 | Singamsetty et al. ...... 455/552.1 |
| 2014/0058935 | A1 | * | 2/2014 | Mijares ........................... 705/41 |
| 2014/0101755 | A1 | * | 4/2014 | Tang ............................... 726/20 |
| 2014/0187157 | A1 | * | 7/2014 | Liao .............................. 455/41.1 |
| 2014/0323042 | A1 | * | 10/2014 | Lee et al. ...................... 455/41.1 |

* cited by examiner

*Primary Examiner* — Sonny Trinh
(74) *Attorney, Agent, or Firm* — Novak Druce Connolly Bove + Quigg LLP

(57) ABSTRACT

A portable electronic device having NFC application function is provided. The electronic device includes a body, a watch-strap portion and a NFC module. The watch-strap portion includes a first watch strap and a second watch strap respectively connected to opposite end portions of the body. The first watch strap and the second watch strap are used to wear the electronic device on a wrist. The NFC module integrates with a plurality of different NFC applications. Therefore, user can use those NFC applications conveniently and safely through the electronic device worn on their wrist.

5 Claims, 3 Drawing Sheets

PORTABLE ELECTRONIC DEVICE HAVING NEAR FIELD COMMUNICATION APPLICATION FUNCTION

BACKGROUND

1. Technical Field

The present disclosure relates to a portable electronic device having near field communication (NFC) application function, which can be worn on the wrist.

2. Description of Related Art

Nowadays, application using NFC technology is very popular. A physical card having NFC module can integrate with several different applications, such as bus card, credit card, access card, bank card and membership card, which brings a great convenience to people's daily life. Thus, making the existing NFC applications more convenient and safer has caused widespread concern.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
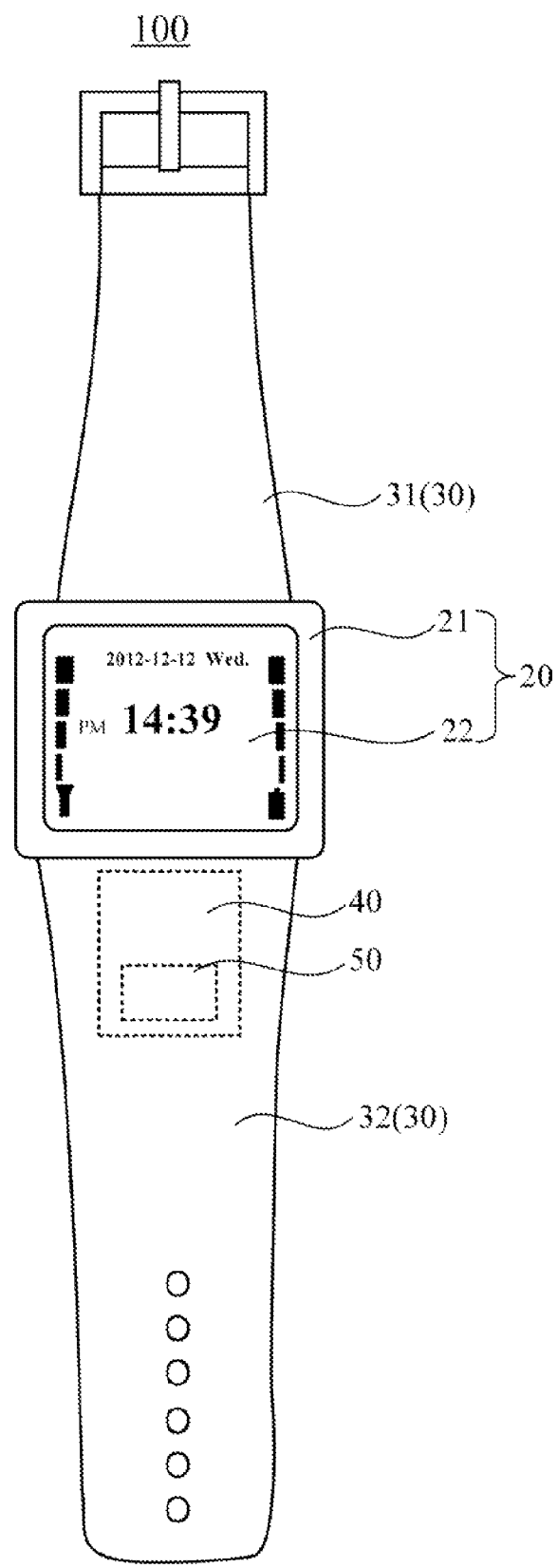
FIG. 1 is a schematic diagram of a portable electronic device, according to a first embodiment.

FIG. 1 shows a portable electronic device 100 of a first embodiment. The electronic device 100 includes a body 20 and a watch-strap portion 30. The body 20 includes a shell 21 and a display unit 22 arranged on the shell 21. The shell 21 can be made of stainless steel, plastic or other materials.

The watch-strap portion 30 includes a first watch strap 31 and a second watch strap 32 respectively connected to opposite end portions of the body 20. The first watch strap 31 and the second watch strap 32 are used to wear the electronic device 100 on a wrist.

In the first embodiment, the electronic device 100 further includes a NFC module 50. The NFC module 50 integrates with several different NFC applications, such as bus card, credit card, access card, bank card and membership card. Therefore, user can use those NFC applications conveniently and safely through the electronic device 100 worn on their wrist.

In the first embodiment, the electronic device 100 further includes a rechargeable battery 40, which is configured to supply power to function modules of the electronic device 100. The battery 40 and the NFC module 50 can be both arranged in the shell 21 of the body 20 or in the watch-strap portion 30. In the first embodiment, the rechargeable battery 40 is a flexible thin-film battery, and is arranged in the watch-strap portion 30. The NFC module 50 is arranged in the battery 40.

Figure 2:
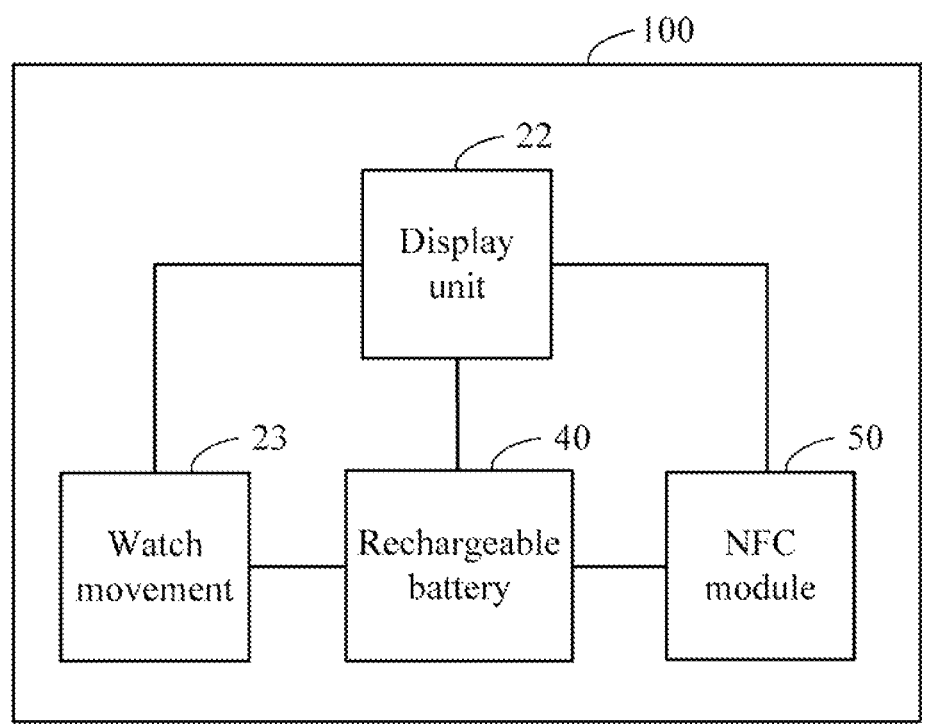
FIG. 2 is a block diagram of the portable electronic device of FIG. 1.

FIG. 2 shows that the electronic device 100 further includes a watch movement 23 arranged in the shell 21. The display unit 22 is electrically connected to the watch movement 23, the battery 40 and the NFC module 50. The display unit 22 is configured to display time, residual capacity value of the battery 40, and other information, such as NFC data of the NFC applications. In the embodiment, the display unit 22 is selected from a group consisted of a liquid crystal display, an organic light emitting diode display and an E-paper display.

Figure 3:
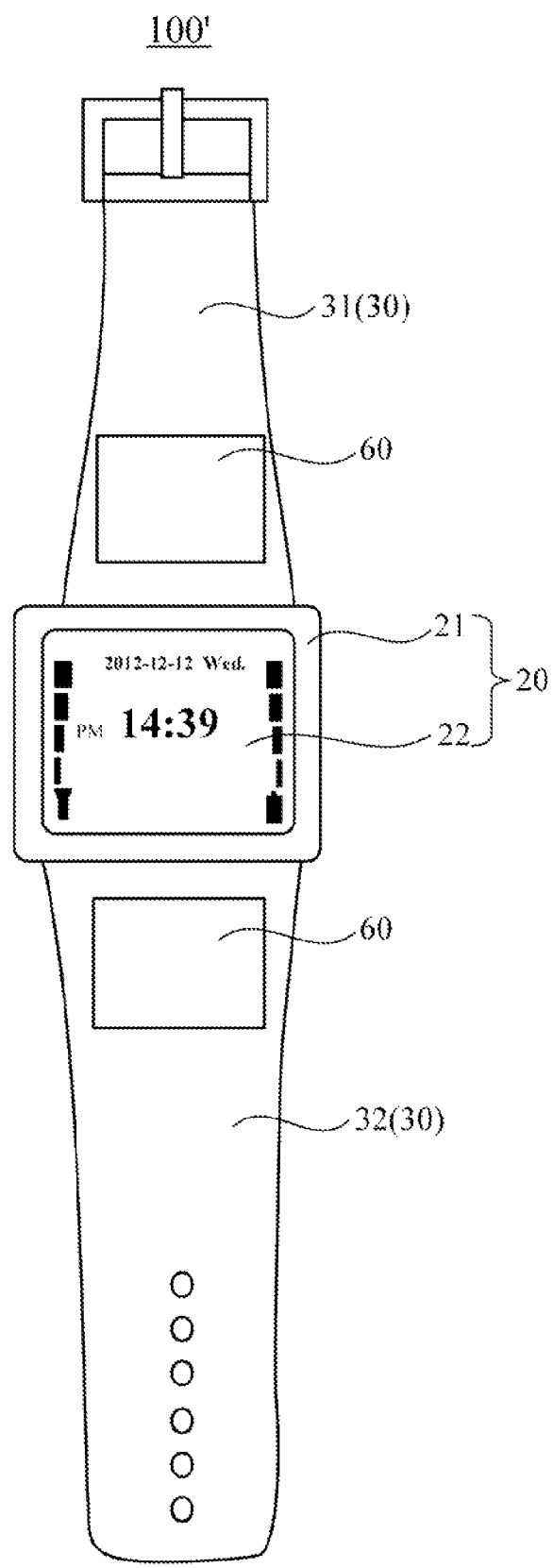
FIG. 3 is another schematic diagram of the portable electronic device of FIG. 1, according to a second embodiment.

In a second embodiment of the electronic device 100', as shown in FIG. 3, a difference of this embodiment from the first embodiment is that the electronic device 100 further includes a number of display panels 60 arranged on the watch-strap portion 30. The display panels 60 are respectively electrically connected to the NFC module 50 and the battery 40. The display panels 60 are configured to display NFC data of the NFC applications, in order to make up for the deficiency of the small size of the electronic device display, and make the electronic device 100 to meet requirements. In some embodiments, the display panels 60 can be flexible E-paper displays.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A portable electronic device comprising:
   a body;
   a watch-strap portion comprising a first watch strap and a second watch strap respectively connected to opposite end portions of the body, wherein the first watch strap and the second watch strap are configured to wear the electronic device on a wrist;
   a NFC module arranged in the watch-strap portion and configured to integrate with a plurality of NFC applications; and
   a rechargeable battery arranged in the watch-strap portion and configured to supply power to function modules of the electronic device, wherein the rechargeable battery is a flexible thin-film battery, and the NFC module is arranged in the battery.

2. The electronic device as described in claim 1, wherein the body includes a shell, a display unit arranged on the shell, and a watch movement arranged in the shell, wherein the display unit is electrically connected to the watch movement, the battery and the NFC module; wherein the display unit is configured to display time, residual capacity value of the battery, and NFC data of the NFC applications.

3. The electronic device as described in claim 2, wherein the display unit is selected from a group consisted of a liquid crystal display, an organic light emitting diode display and an E-paper display.

4. The electronic device as described in claim 1, further comprising a plurality of display panels arranged on the watch-strap portion, wherein the display panels are respectively electrically connected to the NFC module and the battery, and are configured to display NFC data of the NFC applications.

5. The electronic device as described in claim 4, wherein the display panels are flexible E-paper displays.

* * * * *